United States Patent
Wang et al.

(10) Patent No.: US 9,792,334 B2
(45) Date of Patent: Oct. 17, 2017

(54) LARGE-SCALE PROCESSING AND QUERYING FOR REAL-TIME SURVEILLANCE

(71) Applicants: Mengjiao Wang, Shanghai (CN); Wen-Syan Li, Fremont, CA (US)

(72) Inventors: Mengjiao Wang, Shanghai (CN); Wen-Syan Li, Fremont, CA (US)

(73) Assignee: SAP SE, Walldorf (DE)

(*) Notice: Subject to any disclaimer, the term of this patent is extended or adjusted under 35 U.S.C. 154(b) by 190 days.

(21) Appl. No.: 14/496,990

(22) Filed: Sep. 25, 2014

(65) Prior Publication Data

US 2016/0092452 A1 Mar. 31, 2016

(51) Int. Cl.
| | | |
|---|---|---|
| *G06F 7/00* | (2006.01) | |
| *G06F 17/30* | (2006.01) | |
| *G06K 9/00* | (2006.01) | |
| *G08G 1/017* | (2006.01) | |
| *G08G 1/054* | (2006.01) | |
| *G08B 13/196* | (2006.01) | |

(52) U.S. Cl.
CPC .... *G06F 17/30551* (2013.01); *G06F 17/3082* (2013.01); *G06K 9/00785* (2013.01); *G08G 1/0175* (2013.01); *G08G 1/054* (2013.01); *G08B 13/19608* (2013.01); *G08B 13/19656* (2013.01); *G08B 13/19671* (2013.01)

(58) Field of Classification Search
None
See application file for complete search history.

(56) References Cited

U.S. PATENT DOCUMENTS

| | | | | |
|---|---|---|---|---|
| 7,954,359 B1* | 6/2011 | Paderewski | ........... | F42B 30/006 |
| | | | | 73/12.01 |
| 2003/0236904 A1* | 12/2003 | Walpole | .............. | H04L 12/1881 |
| | | | | 709/231 |
| 2004/0034856 A1* | 2/2004 | Boudnik | ................. | G06F 9/465 |
| | | | | 718/103 |
| 2007/0239862 A1* | 10/2007 | Bronez | ................... | H04L 12/24 |
| | | | | 709/223 |
| 2010/0280983 A1* | 11/2010 | Cho | ........................ | G10L 15/22 |
| | | | | 706/46 |
| 2011/0276396 A1* | 11/2011 | Rathod | ............. | G06F 17/30867 |
| | | | | 705/14.49 |

(Continued)

OTHER PUBLICATIONS

Walens, et al., "Cloud PARTE: Elastic Complex Event Processing based on Mobile Actors", Proceedings of AGERE! 2013, 3rd International Workshop on Programming based on Actors, Agents, and Decentralized Control, pp. 3-12. ACM, (Oct. 2013).

*Primary Examiner* — Uyen Le
(74) *Attorney, Agent, or Firm* — Brake Hughes Bellermann LLP

(57) ABSTRACT

A priority request handler may receive a priority request to associate a priority label with a sensed data file, the sensed data file being included within a time series of sensed data files received from a plurality of sensors. A queue manager may then store the sensed data file within a priority queue in association with the priority label, and independently of a temporal order of a time series of sensed data files. The queue manager may thus retrieve the sensed data file from the priority queue, based on the priority label, for processing thereof to obtain a sensed data record.

20 Claims, 6 Drawing Sheets

(56) References Cited

U.S. PATENT DOCUMENTS

| | | | |
|---|---|---|---|
| 2012/0289236 A1* | 11/2012 | Xu | H04W 16/14 455/446 |
| 2013/0138646 A1* | 5/2013 | Sirer | G06F 17/30545 707/736 |
| 2014/0191863 A1* | 7/2014 | Ten Kate | H04M 3/5116 340/539.12 |
| 2015/0049613 A1* | 2/2015 | D'Amora | H04L 12/24 370/235 |

* cited by examiner

LARGE-SCALE PROCESSING AND QUERYING FOR REAL-TIME SURVEILLANCE

TECHNICAL FIELD

This description relates to surveillance networks.

BACKGROUND

Surveillance systems are commonly used, including surveillance systems in public places and in private enterprises. While some such systems are small in scope, many are implemented specifically to be used in monitoring very large numbers of monitored items. For example, surveillance systems used to monitor traffic in large cities may be expected to continually obtain, process, and store huge numbers of image files in which images of corresponding vehicles are included.

In these and similar surveillance systems, it is difficult to provide a desired level of timeliness and type of processing of captured images or other data records, particularly considering practical limitations on the availability of computing resources. As a result, a utility of existing surveillance systems may be limited, since desired information within captured data may not be available when needed, or may not be retrievable in practical or efficient manner.

SUMMARY

The present description describes the assigning of priority labels to incoming data, so that specified images or other data records may be prioritized for processing, storage, and querying thereof. For example, users are enabled to provide a priority label in association with a particular camera or other sensor, or in association with a particular item (e.g., vehicle) being monitored. In this way, associated data records may be processed out-of-order from otherwise-received sensed data (e.g., images). Consequently, processing for the designated data may be prioritized within the context of a plurality of available, load-balanced servers, so that real-time alerts may be issued. Moreover, the resulting processed data may be stored quickly, using a key-value store and a distributed, load-balanced storage scheme. In this way, the prioritized, processed data may be made available for querying thereof in a fast, efficient manner.

According to one general aspect, a system may include at least one processor, and instructions recorded on a non-transitory computer-readable medium, and executable by the at least one processor. The system may include a priority request handler configured to receive a priority request to associate a priority label with a sensed data file, the sensed data file being included within a time series of sensed data files received from a plurality of sensors. The system may also include a queue manager configured to store the sensed data file within a priority queue in association with the priority label, and independently of a temporal order of a time series of sensed data files, and further configured to retrieve the sensed data file from the priority queue, based on the priority label, for processing thereof to obtain a sensed data record.

According to another general aspect, a computer-implemented method for executing instructions stored on a non-transitory computer readable storage medium may include receiving sensed data files from a plurality of sensors, the sensed data files corresponding to sensed items, storing the sensed data files in a time-ordered fashion within a priority queue, and receiving a priority request to associate a priority label with a designated sensed data file for a designated item of the sensed items that is expected to be sensed by at least one of the plurality of sensors. The method may further include receiving the designated sensed data file and relating the designated sensed data file with the priority label, storing the designated sensed data file in the priority queue, ahead of the earlier-received, time-ordered sensed data files, and retrieving the designated sensed data file for processing to obtain a designated sensed data record, before retrieving the earlier-received, time-ordered sensed data files.

According to another general aspect, a computer program product may be tangibly embodied on a non-transitory computer-readable storage medium and may include instructions that, when executed, are configured to cause at least one processor to receive a priority request to associate a priority label with a sensed data file, the sensed data file being included within a time series of sensed data files received from a plurality of sensors. The instructions, when executed, may be further configured to cause the at least one processor to store the sensed data file within a priority queue in association with the priority label, and independently of a temporal order of a time series of sensed data files, retrieve the sensed data file from the priority queue, based on the priority label, and process the sensed data file to obtain a sensed data record.

The details of one or more implementations are set forth in the accompanying drawings and the description below. Other features will be apparent from the description and drawings, and from the claims.

DETAILED DESCRIPTION

Figure 1:
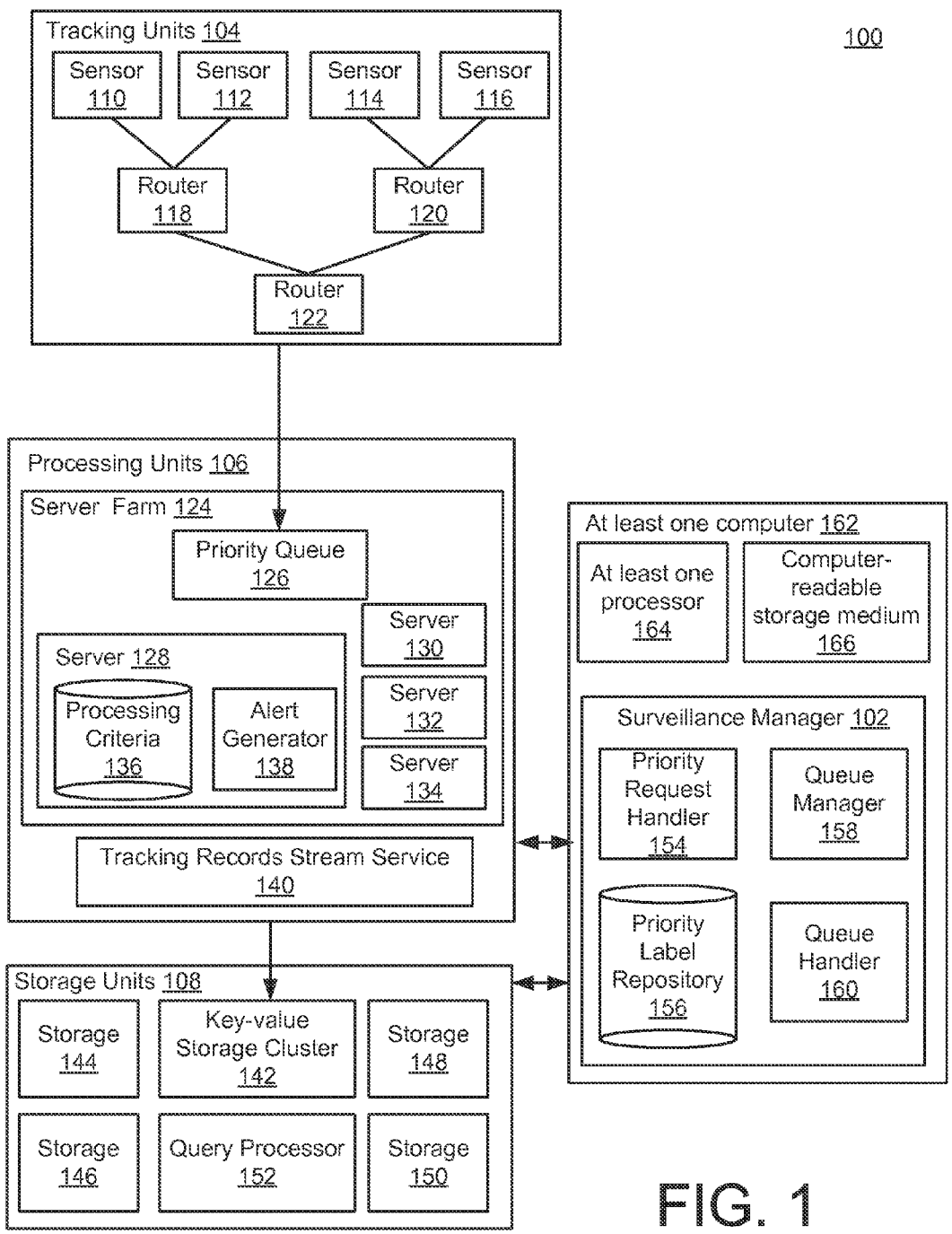
FIG. 1 is a block diagram of a system for large scale processing and querying for real-time surveillance.

FIG. 1 is a block diagram of a system 100 for a large scale processing and querying for real-time surveillance. In the example of FIG. 1, a surveillance manager 102 is operable to support real-time surveillance, as well as detailed and efficient querying of surveillance data, even when the system 100 is utilized to track or otherwise perform surveillance on extremely large numbers of items. More particularly, as described in detail below, the surveillance manager 102 supports customized prioritization of received sensor data, along with load balanced processing and storage of the sensor data. Consequently, for example, users of the system 100 may receive critical data in a timely fashion, and may effectively leverage stored and processed sensor data by enabling fast, effective, and efficient querying of the stored and processed sensor data.

In the example of FIG. 1, the surveillance manager 102 utilizes a plurality of tracking units 104, which are illustrated in the simplified example of FIG. 1 as including representative sensors 110, 112, 114, 116. That is, as shown, the tracking units 104 of FIG. 1 are illustrated as including four generic sensors 110-116, where it should be appreciated that, in actual implementations, the tracking units 104 may include a potentially huge number of sensors. For example, the tracking units 104 may include hundreds or thousands of sensors distributed within one or more geographical areas.

Moreover, it should be appreciated that the tracking units 104 may include one or more different types of sensors. For example, in many of the example implementations described below, the sensors 110-116 are described as including cameras or other image sensors. However, in other implementations, the sensors 110-116 might include virtually any sensor that is designed to capture sensed data. For example, the sensors 110-116 might include audio sensors, temperature or pressure sensors, weight or distance sensors, light sensors, vibration sensors, or virtually any other sensor that is capable of transducing and otherwise capturing sensed data representing a physical phenomenon or event, or combinations of such sensors. Thus, when referencing items sensed by the sensors 110-116, it should be understood that any such sensed items refer to an object(s) of sensing of a corresponding sensor type; e.g., an item in an image file, a sound within an audio file, or items vibrating, being weighed, or otherwise measured, as stored within corresponding file types.

Consequently, it should be appreciated that the sensor manager 102 may be used to perform tracking or other surveillance in many different scenarios, and for many different purposes. For example, as mentioned in various examples herein, the sensor manager 102 may be used to facilitate traffic surveillance. In addition, the sensor manager 102 may be used in virtually any security scenario, such as monitoring for theft or vandalism, e.g., at stores, government-owned facilities, or public spaces. In other examples, the sensor manager may be used to monitor persons, animals or vehicles, e.g., for the purpose of observing behavior or other activity. In still other examples, the sensor manager may be used to monitor facility operations, such as operations of a manufacturing or warehouse facility, in order to ensure efficient and reliable operations. Other examples are mentioned herein, or would be apparent to one of skill in the art.

As shown in the simplified example of FIG. 1, routers 118, 120, 122 may be utilized to transmit, store, aggregate, or otherwise collect and forward sensed data from the sensors 110-116. Specifically, as shown, routers may be arranged at different levels of a router hierarchy, so as to collect, aggregate, and transmit sensed data in a practical, cost-effective, and efficient manner. Specifically, as shown, the router 118 is illustrated as collecting sensed data from the sensors 110, 112, while the router 120 is illustrated as collecting sensed data from the sensors 114, 116. Then, the router 122 is illustrated as being at a higher hierarchical router level than the routers 118, 120. Consequently, the router 122 is illustrated as receiving, aggregating, and providing collected sensed data from the routers 118, 120. In this way, sensed data may be collected, aggregated, and forwarded in an efficient, cost-effective manner.

Thus, for purposes of this description, it is assumed that the tracking units 104 include cameras or other sensors having wired or wireless connections, and that the cameras or other sensors are configured to upload raw sensor data, (e.g., raw pictures) to the processing unit 106. In actual implementations of the system 100 of FIG. 1, a design of a deployment and use of the tracking units 104 may be provided on a case-by-case basis, integrating a number of available solutions for performing tracking or other surveillance. Consequently, further details of configuration and implementation of the tracking units 104 are not provided herein, except as may be necessary or helpful in understanding operations of the system 100 of FIG. 1.

In the example of FIG. 1, as described in detail below, it is assumed simply that the various sensors 110-116 are configured to capture and otherwise provide raw-sensed data as quickly as possible, given applicable constraints. Moreover, as also described below, it is assumed that the tracking units 104, e.g., a high-level router, such as the router 122, operate to provide sensed data in the form of individual, discrete sensed data files in a time series, temporally ordered, and/or chronological fashion. For example, it may occur that each of the sensors 110-116 is operable to continuously record individual images or other sensed data, and that each of the sensors 110-116 associates a time stamp with each instance of captured sensed data. Then, the various resulting sensed data files may be ordered according to times of capture thereof. Thus, for example, in some implementations, individual image files may be time-ordered in accordance with time stamps specified in association with corresponding image files.

In some implementations, for example, the highest level router 122 may be tasked with ensuring a time-ordering of all sensed data files received. In other example implementations, it may not be necessary or required to ensure complete chronological order of all sensed data files, e.g., image files, as captured by the various sensors 110, 116. For example, due to computing, bandwidth, storage, or other constraints, sensed data files from one or more of the sensors 110-116 may be batch-processed at corresponding routers 118, 120. Consequently, it could occur that sensed data files routed by the routers 118, 120, 122, or at least subsets of such sensed data files, are arranged in time series, temporal, or otherwise chronological order, so that a default outputting of sensed data records from the tracking units 104 is assumed to correspond roughly or exactly to a first captured, first transmitted data capture scheme.

In many cases, however, as referenced above and described in detail below, it may occur that a number of received sensed data files is too large to assume that sufficient computing resources are available to process and store all of the received sensed data records in a sufficiently timely or efficient manner. Moreover, it may occur that a later-received sensor data record is more important than any preceding sensed data record that has already been captured. Thus, it may be understood from the description just provided that, in conventional systems, it may be difficult or impossible to process or otherwise utilize captured sensed data files in a manner which ensures or even enables a timely processing and use of high priority sensed data records. Instead, such conventional surveillance systems may be forced to wait while relatively lower priority sensed data files are processed and stored, before reaching a sensed data file that is of relatively higher importance. As a result, such conventional surveillance systems are frequently unlikely to provide a desired or required level of timely processing of sensed data files.

In contrast, as described in detail below, in the system 100, the processing units 106 include a server farm 124 that utilizes a priority queue 126 managed by the surveillance manager 102. More specifically, the priority queue 126 may be configured and managed to utilize priority labels associated with designated sensed data files, so as to thereby prioritize a processing, storage, or other use of the prioritized sensed data files.

For example, as described in detail below with respect to FIG. 2, the priority queue 126 may be configured to include a plurality of priority levels, so that incoming sensed data files received from the router 122 of the tracking units 104 may be stored within the priority queue 126 by matching a priority label of the received sensed data file with a priority level within the priority queue 126. Accordingly, in these and other example implementations, relatively more important, high priority sensed data files may be processed, stored, or otherwise utilized in a manner that is independent of a temporal order in which the various sensed data files were received at the router 122 of the tracking units 104. Consequently, a user of the system 100 may be provided with desired sensor data in a timely and efficient manner.

Then, sensed data files may be read from the priority queue 126 by a plurality of servers 128, 130, 132, and 134 of the server farm 124. That is, as already described above with respect to the various sensors 110-116 of the tracking units 104, it may be appreciated that the servers 128-134 of the server farm 124 are intended to be representative of a potentially large number of servers that are available for processing sensed data files received from the priority queue 126. Thus, by distributing the processing load of processing the various sensed data files, the server farm 124 enables fast and efficient processing of received sensed data files, and, along with the priority queue 126, ensures that high priority sensed data files are processed in a manner which enables real-time or near real-time surveillance, along with prompt, thorough, and efficient querying of processed sensed data files.

For example, as shown in FIG. 1, the server 128 is illustrated as including processing criteria 136, which generally refers to factors utilized by the server 128 in processing a received sensed data file. For example, the processing criteria 136 may specify types of metadata to be included with the sensed data file in constructing a sensed data record for storage using the storage units 108. For example, such metadata may include a context in which the relevant sensed data was captured, such as an identity of a particular sensor of the sensors 110-116, or a location or other characteristic thereof.

Other types of metadata may be specific to the type of sensor being used. For example, in scenarios in which a relevant sensor includes a camera, so that the sensed data file is an image file, relevant metadata may include a color or shape of the object within the image, e.g., a vehicle or a person. Other types of metadata, corresponding to various types of sensors that might be used within the tracking units 104, as well as other processing techniques associated with all such captured sensor data, are generally well known, and are therefore not described herein in further detail, except as may be necessary or helpful in understanding operations of the system 100 of FIG. 1.

In some implementations, the processing criteria 136 may specify processing that utilizes two or more sensed data files, in order to enable a corresponding rule engine to derive or otherwise determine desired information. For example, as described in detail below, in scenarios in which the system 100 is utilized for vehicle tracking, the processing criteria 136 may specify processing of two or more time ordered images of a specific vehicle, so as to determine whether the vehicle has exceeded a maximum speed limit. Again, as just referenced, such processing techniques, by themselves, are known within corresponding relevant fields. Nonetheless, such processing techniques are mentioned here for the sake of illustrating a capability and utility of the system 100 in providing the types of timely and efficient processing described herein. For example, as illustrated in FIG. 1, the server 128 may include an alert generator 138 that is configured to provide a real-time or near real-time alert to a user of the system 100.

For example, with respect to the example just provided, the system 100 may be used by law enforcement to monitor compliance of vehicles with applicable traffic laws. Then, as described in detail below, a specific vehicle may be designated as being high priority, such as when the police suspect that a criminal is operating the vehicle in question. Then, the vehicle in question may be prioritized within the priority queue 126. That is, images that include the vehicle in question, or that are considered highly likely to include the vehicle in question, may be given a high priority label corresponding to a high priority level within the priority queue 126. Then, the corresponding images may be provided quickly to the server 128, whereupon the alert generator 138 may utilize the processing criteria 136 to generate one or more real-time alerts regarding a behavior or characteristic of the vehicle in question.

More specifically, it may be appreciated that, although not specifically or explicitly illustrated in the simplified example of FIG. 1, servers 130, 132, 134 may include corresponding instances of the processing criteria 136 and the alert generator 138. Then, in operation, as described below, a server of the servers 128-134 that is currently experiencing a lightest processing load may be assigned with the processing of the high priority image file. In this way, again, the high priority image file is ensured of receiving timely and efficient processing.

As images or other sensed data files are processed by the various servers 128-134, a tracking record stream service 140 may be utilized to stream the processed sensed data records to the storage units 108. For example, the tracking record stream service 140 may be implemented as a Java database connection (JDBC) interface, which may be provided by a provider of the tracking units 104, and which is compatible with data formats and other characteristics of outputs of the various sensors 110-116. Of course, any other appropriate interface may also be used.

In this way, the processed sensed data records may be provided to a key-value storage cluster 142 of the storage units 108. As shown, the key value storage cluster 142 may utilize individual storage units 144, 146, 148, 150, to thereby achieve load balancing with respect to the storage of the processed sensed data records.

More particularly, as described in detail below, e.g., with respect to FIG. 6, individual, unique keys may be associated with corresponding individual sensed data records. Then, the key value storage cluster 142 may implement a hash-based scheme for storing the unique sensed data records in a distributed, load balanced fashion, and in a manner that enables fast and efficient retrieval of desired information.

More particularly, as shown in FIG. 1, a query processor 152 may be utilized to receive queries, e.g., from the surveillance manager 102, to thereby identify individual sensed data records within one or more of the storage units 144-150, and thereby provide corresponding query results to the surveillance manager 102. For example, continuing the example referenced above in which the system 100 is operated by law enforcement officials monitoring compliance with applicable traffic laws, the query processor 152 may be utilized to identify all vehicles which violated a specific traffic law within a given time period.

In operation, the query processor 152 should be understood to implement any applicable, conventional query processing techniques. For example, the query processor 152 might construct and utilize one or more indexes for increasing a speed of queries to be executed. Such query processing techniques, as described above with respect to the sensed data file processing techniques implemented by the servers 128-134, by themselves, are assumed to be generally understood, and are therefore not described herein in further detail, except as may be necessary or helpful in understanding operations of the system 100 of FIG. 1. Nonetheless, it may be appreciated that the storage techniques described with respect to the construction and use of the storage units 108 in the context of FIG. 1, along with the prioritizations of processing of the sensed data files by the servers 128-134, enable fast, accurate, efficient, and reliable query processing, even for extremely large quantities of stored sensor data records.

In managing operations of the tracking units 104, the processing units 106, and the storage units 108, the surveillance manager 102 may include a priority request handler 154. The priority request handler 154 may be configured to receive, from a user of the system 100, a priority label to be associated with a particular image, type of image, or other sensed data file received by the priority queue 126. In other words, the priority request handler 154 may receive a request from the user of the system 100 to associate a specific priority label with a specific image or other sensed data file, either directly or indirectly, as described in detail below. In the example of FIG. 1, then, a priority label repository 156 may be configured to store a requested priority label in conjunction with relevant identifying characteristics that enable the desired association of the specified priority label with corresponding received sensed data files received at the priority queue 126.

Then, a queue manager 158 may be configured to store a received image or other sensed data file that is determined to correspond to the requested priority label within a priority level of the priority queue 126 that corresponds to the priority label in question. For example, and continuing the example scenarios referenced above, in traffic surveillance systems, a priority label may be associated with a particular vehicle, as may be uniquely identified by a license plate thereof. As referenced above, the priority label may be associated directly with the vehicle/license plate in question, as detected within the received image files. In other implementations, the priority label may be associated with a particular camera represented by a corresponding sensor of the sensors 110-116. For example, if a desired vehicle is traveling in a vicinity of the sensor (i.e., camera) 110, then high priority labels may be associated with the sensors (i.e., cameras) 110, 112, so that all images received therefrom are processed with a high priority.

In operation, the queue manager 158 also may be configured to distribute the prioritized sensed data files, and all sensed data files within a priority queue 126, within and among the various servers 128-134 of the server farm 124. For example, sensed data files from the priority queue 126 may be distributed among the servers 128-134 in a round robin fashion, or, as referenced above, based on current workload of the individual servers 128-134.

Also within the surveillance manager 102, a query handler 160 may be configured to enable a user of the system 100 to interact with the query processor 152 of the storage units 108, to thereby search and otherwise access sensed data records from within the storage units 108. For example, the query handler 160 may be configured to provide an appropriate graphical user interface (GUI), with which the user of the system 100 may enter desired query terms, and receive corresponding query results.

In various examples, the query handler 160 may be utilized by a user of the system 100 on an as-needed basis. In other examples, the query handler 160 may be configured to provide automatic reporting, e.g., on a daily, weekly, or monthly basis.

In FIG. 1, it may be appreciated that the surveillance manager 102 is illustrated as being implemented using at least one computer 162, which itself is illustrated as including at least one processor 164 and non-transitory computer readable storage medium 166. In other words, the surveillance manager 102 should be understood to be implemented, in various example embodiments, using an appropriate local workstation accessed by the user of the system 100.

Of course, the at least one computer 162 may be understood to be a simplified example representation of one or more computers used to implement the surveillance manager 102, where instructions for implementing the surveillance manager 102 may be stored using the computer readable storage medium 166, and executed by the at least one processor 164. Thus, the at least one computer 162 should be understood to include various other hardware and software components, and associated peripheral devices, not specifically or explicitly illustrated in the simplified example of FIG. 1. For example, the at least one computer 162 should be understood to include any network or other communications interface required to communicate with the processing units 106 and/or the storage units 108. Further, the at least one computer 162 should be understood to be associated with any appropriate monitor or other display, which may be used to provide one or more graphical user interfaces utilized by the user of the system 100 to interface with the priority request handler 154, the queue manager 158, and/or the query handler 160.

Further, the surveillance manager 102 is illustrated as including several discrete modules 154-160. However, it may be appreciated that, in various implementations, any one of these modules may be implemented as two or more separate sub-modules. Conversely, any two or more of the modules may be combined for implementation as a single module. Further, additional or alternative modules, not specifically or explicitly illustrated in the example of FIG. 1 also may be included.

Still further, inasmuch as the at least one computer 162 should be understood to represent two or more computers, it may be appreciated that, although the surveillance manager 102 is illustrated as being implemented separately from the processing units 106 and the storage units 108, it may occur that some or all of the surveillance manager 102 may be implemented in conjunction with the processing units 106 and/or the storage units 108. To give a specific example, the queue manager 158, or portions thereof, may be implemented in conjunction with one or more of the servers 128-134 of the server farm 124, and in conjunction with the priority queue 126. Similarly, although the servers 128-134 are illustrated as executing separately from the surveillance manager 102, aspects of implementations of the servers 128-134 may be understood to be including, in some implementations, as part of the surveillance manager 102. For example, the alert generator 138 may be considered to be part of the surveillance manager 102.

Figure 2:
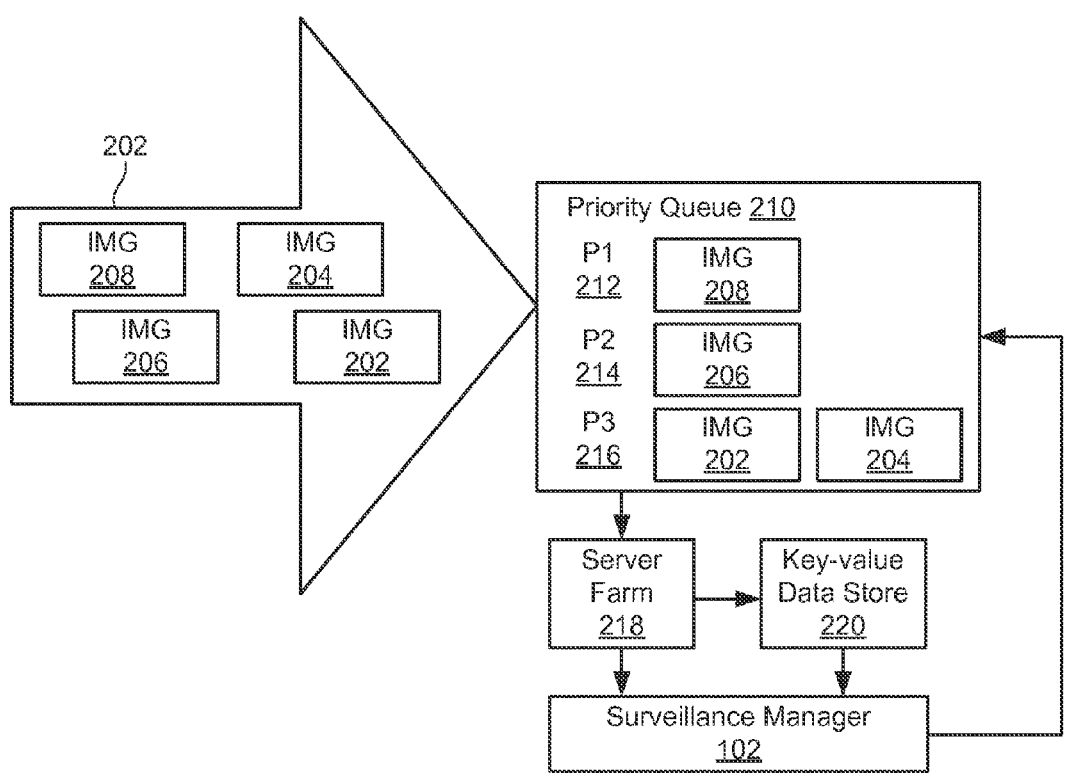
FIG. 2 is a block diagram of an example implementation of a priority queue of FIG. 1.

In the example of FIG. 2, an image stream 202 is illustrated as including a plurality of received images 202, 204, 206, 208. That is, the images 202-208 should be understood to represent sensed data files provided by the router 122 in the example of FIG. 1, in example scenarios in which the sensors 110-116 represent cameras capturing image files. Then, a priority queue 210 should be understood to represent an instance of the priority queue 126 of FIG. 1.

As shown in FIG. 2, the images 202-208 are transmitted in temporal order. Thus, for example, it should be understood that the first image 202 has been taken prior to a time of image capture of the image 204. Similarly, the second image 204 should be understood to have been captured prior to the third image 206, which itself has been captured prior to the fourth image 208.

In a default setting, the priority queue 210 should be understood to represent a first-come, first-serve data structure, in which images received from cameras or other sensors are processed in temporal order. However, as described above, in cases in which real-time or near real-time tracking of specific tracked items, e.g., vehicles, is desired, such a first-come, first-serve data structure, by itself, imparts delays in scenarios in which large volumes of images are present, and/or in which the desired item appears later in time with respect to other items being tracked.

Thus, as described above with respect to FIG. 1, the priority queue 210 may be configured to include multiple priority levels, illustrated in the example of FIG. 2 as a priority level 212, a second priority level 214, and a third priority level 216. In the simplified example of FIG. 2, the first priority level, illustrated as P1 212, represents a highest priority level. The second priority level, illustrated as P2 214, represents an intermediate priority level. Finally, the third priority level, illustrated as P3 216, may be understood to represent a default priority level, at which received image files are stored in a default manner, e.g., in temporal order of receipt. Of course, the priority queue 210 may, in various implementations, include an arbitrary number of priority levels, so that the example of the three priority levels 212-216 in FIG. 2 should be understood to be a non-limiting example.

Thus, in the example of FIG. 2, it is assumed that the surveillance manager 102 has been utilized by the user to associate a priority label for the highest priority level P1 212 for the image 208. As already described, in the example, the image 208 is received after images 202-206. Nonetheless, as shown, the image 208 may be inserted within the priority queue 210 at the highest priority level P1 212, and will thus be processed by the server farm 218 with a higher priority than any of the images 204-206.

Similarly, it is assumed that the image 206 has been directly or indirectly associated with a priority level corresponding to the second highest priority level P2 214 of the priority queue 210. Consequently, as shown, the image 206 is inserted at the level of the priority level P2 214, so that the image 206 will be processed ahead of the remaining images 202, 204, which themselves are stored at the lowest or default priority level P3 216.

In other words, in operation, as the initial images 202, 204 are received, the queue manager 158 recognizes that no priority label has been associated therewith, and the images 202, 204 are inserted in time order at the default priority level P3 216. Afterwards, the image 206 is received, and is determined to have been associated, by way of the priority request handler 154, with a priority label corresponding to the second highest priority level P2 214. Accordingly, the image 206 is inserted within the priority queue 210 at the level P2 214. Thus, the image 206 will be processed ahead of either of the images 202, 204.

Similarly, the image 208 is determined by the queue manager 158 to be associated with the priority label corresponding to the highest priority level P1 212. The image 208 is thus placed within the priority queue 210 at the priority level P1 212, and will be processed by the server farm 218 prior to processing of any of the images 202-206.

Thus, the priority queue 210 should be understood to return image files having a highest priority level first. For elements having an identical priority level, the priority queue will return them to the server farm 218 in temporal order. This has been described with respect to the default priority level P3 216 and images 202, 204, but would be understood to apply equally to either of the priority levels 212, 214, in scenarios in which one of these priority levels includes two or more images.

Thus, the systems of FIGS. 1 and 2 illustrate examples in which distributed computer clusters are used to efficiently process image flows obtained from cameras, or data flows of any type of sensed data files received from corresponding sensors. The described priority queue based distributed image processing, and associated key-value based tracking log storage architecture, allows for a load balanced design in both the computing units 106 and the storage units 108. Moreover, image processing priorities may be automatically adjusted based on specified priority designations. As a result, real-time tracking of specified items under surveillance may be provided, in conjunction with continuous querying, which is performed efficiently even when the described historical tracking log storage architecture is storing huge quantities of data. Further, real-time or near real-time tracking for high priority items under surveillance is provided, to thereby enable ad-hoc analysis with respect to specific items (e.g., vehicles) under surveillance.

Figure 3:
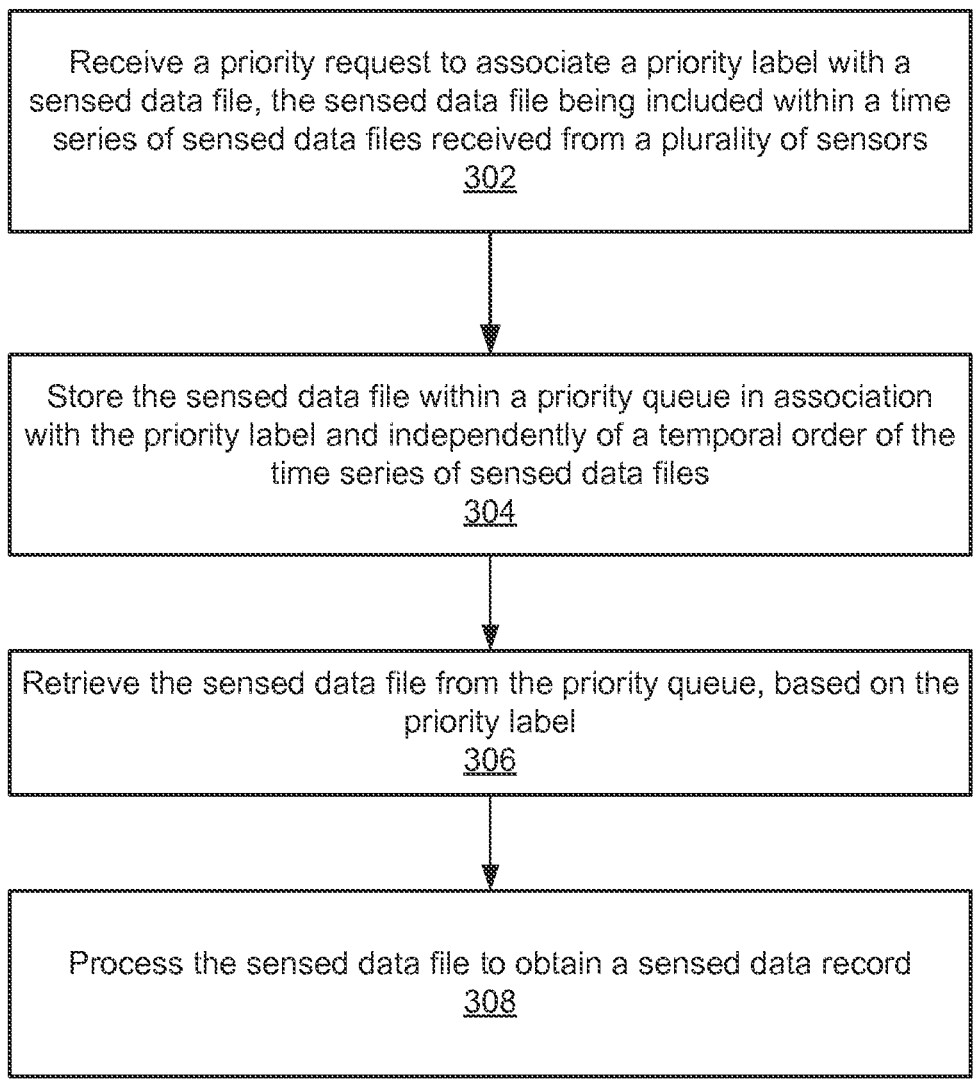
FIG. 3 is a flowchart illustrating example operations of the systems of FIGS. 1 and 2.

FIG. 3 is a flowchart 300 illustrating example operations of the systems of FIGS. 1 and 2. In the example of FIG. 3, operations 302-308 are illustrated as separate, sequential operations. However, in various implementations, one or more additional or alternative operations or sub-operations may be included, and/or one or more operations or sub-operations may be omitted. In all such implementations, it may be appreciated that any two or more of such operations may be performed in a partially or completely overlapping or parallel manner, or in a nested, iterative, branched, or looped fashion.

In the example of FIG. 3, a priority request to associate a priority label with a sensed data file may be received, the sensed data file being included within a time series of sensed data files received from a plurality of sensors (302). For example, as described, the priority request handler 154 may receive such a priority request from a user of the system 100, to thereby store, using the priority label repository 156, an association between a priority label and one or more received sensed data files. In this regard, as described above, a sensed data file refers to any data file output by a sensor. For example, the sensed data file could include an audio file, or, as described in various examples herein, could include an image file captured by a camera.

As also described, the priority request handler 154 may be configured to provide an appropriate GUI to provide the user with any available options for directly or indirectly associating the desired priority label with the one or more sensed data files in question. For example, the user may be provided with an ability to designate a desired priority label in conjunction with a particular item being tracked. In other examples, a user may be enabled to assign a desired priority label to one or more sensors that are known, or thought to be likely, to capture sensed data related to the specific item being tracked. For example, the priority label may be applied to one or more cameras that are thought to be in a vicinity of a vehicle for which enhanced or real-time tracking is desired.

In yet other examples, the priority label may be associated with a specific time window. For example, in the vehicle surveillance examples, it may occur that law enforcement believes that a particular vehicle being tracked was present within vicinity within a certain time window, but that the images associated with the time window are not due for processing until after completion of a large number of preceding image files that have already been captured. Then, by designating the time window in question as being associated with an appropriately high priority label, images included within the time window may be processed in a prioritized fashion.

The sensed data file may be stored within a priority queue in association with the priority label, and independently of a temporal order of a time series of sensed data files (304). For example, the queue manager 158 may be configured to store the one or more sensed data files within the priority queue 126 or the priority queue 210. As illustrated and described with respect to the priority queue 210, implementations of such a priority queue may include a number of priority levels, corresponding to potential priority labels, including the priority label received by way of the priority request handler 154. Then, as also illustrated with respect to FIG. 2, the prioritized sensed data file may be stored within the priority queue 210 at a corresponding priority level, e.g., a priority level P1 212. As illustrated and described specifically with respect to the image file 208, a thus-prioritized image file, despite being received last within the temporal order of the image file 202-208, may nonetheless be stored at the highest priority level P1 212 within the priority queue 210.

Consequently, the sensed data file may be retrieved from the priority queue, based on the priority label (306). For example, the queue manager 158 may retrieve, in the example of FIG. 2, the image 208 having a priority label associated with the highest priority level P1 212, for processing thereof at the server farm 218. Again, it should be appreciated that the image file 208 is thus retrieved from the priority queue 210 in advance of retrieval of the images 202-206, even though all of the images 202-206 were received at the priority queue 210 prior to receiving the image file 208. In this way, for example, immediate processing of the image 208 may be executed in order to enable real-time alerts or other real-time reporting or analysis with respect to the prioritized, sensed data file.

Specifically, for example, the sensed data file may be processed to obtain a sensed data record (308). For example, the queue manager 158 may be configured to utilize an appropriate one of the servers 128-134 to generate the described sensed data record, which may include the sensed data file in conjunction with various associated metadata thereof, for storage using the storage units 108 and the included key value storage cluster 142, as described herein. That is, as described herein, the resulting sensed data records should be understood to be of a format and type that is consistent with storage within the storage units 108, where specific examples of such techniques are described in more detail below, e.g., with respect to FIG. 6.

Although not specifically or explicitly illustrated in the simplified, high level example of FIG. 3, and as referenced above, additional operation may be included in implementations of the flowchart 300. For example, real-time alerts for prioritized items under surveillance may be generated, and the sensed data record may be stored using techniques that facilitate fast, accurate, and reliable query processing therefore.

Figure 4:
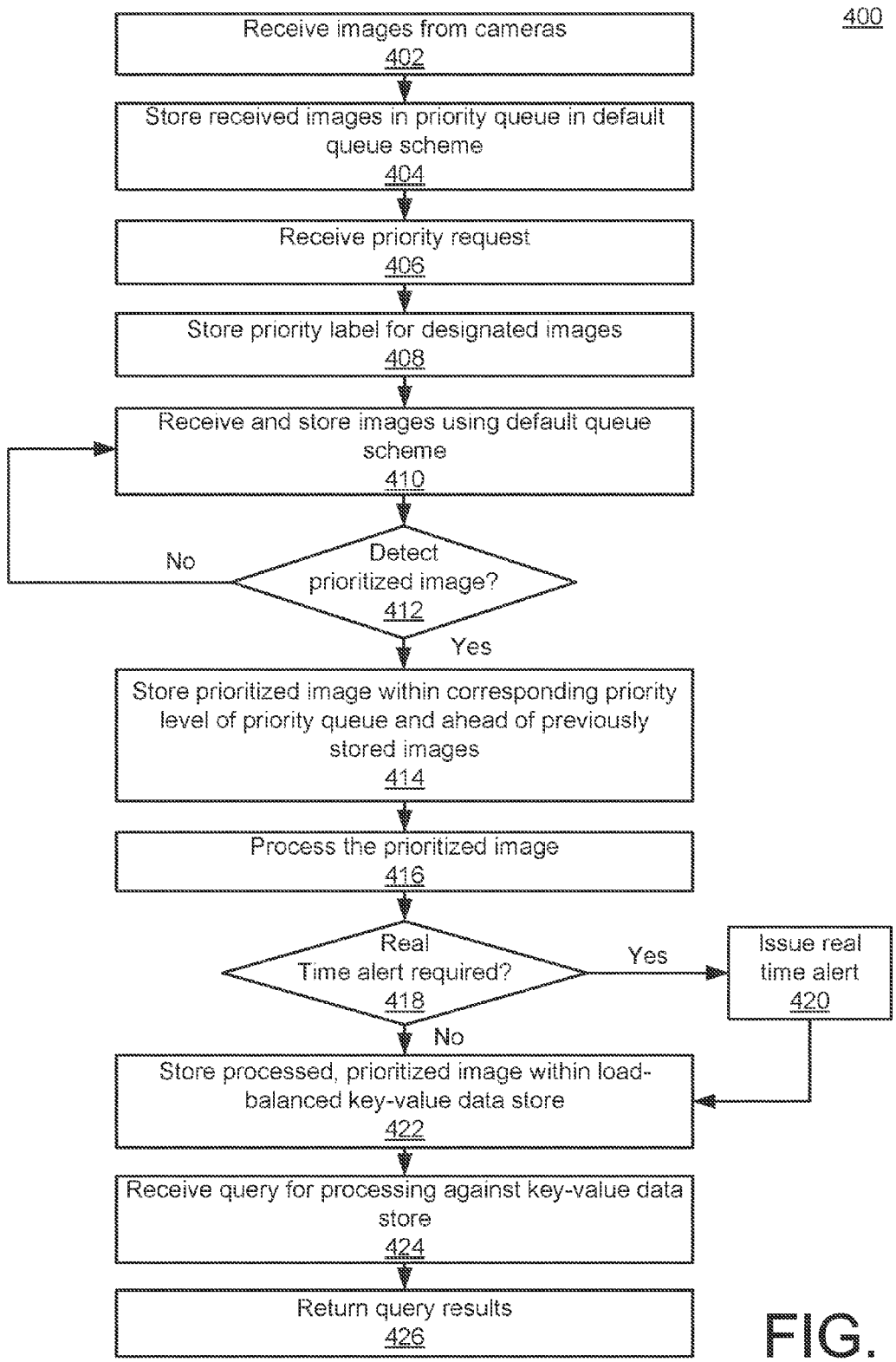
FIG. 4 is a flowchart illustrating more detailed example operations of the systems of FIGS. 1 and 2.
Figure 5:
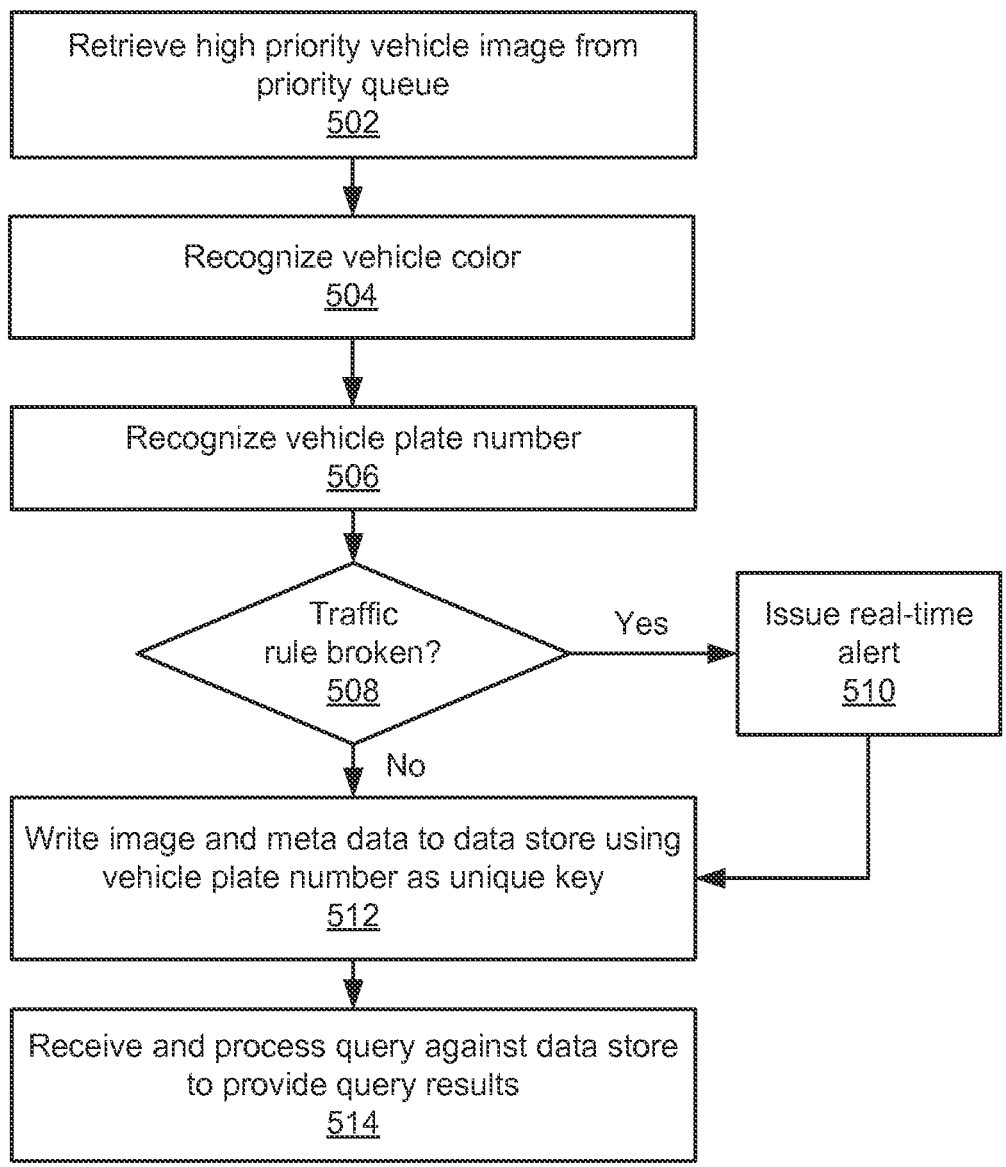
FIG. 5 is a flowchart illustrating example operations of the systems of FIGS. 1 and 2 in implementations involving traffic surveillance.
Figure 6:
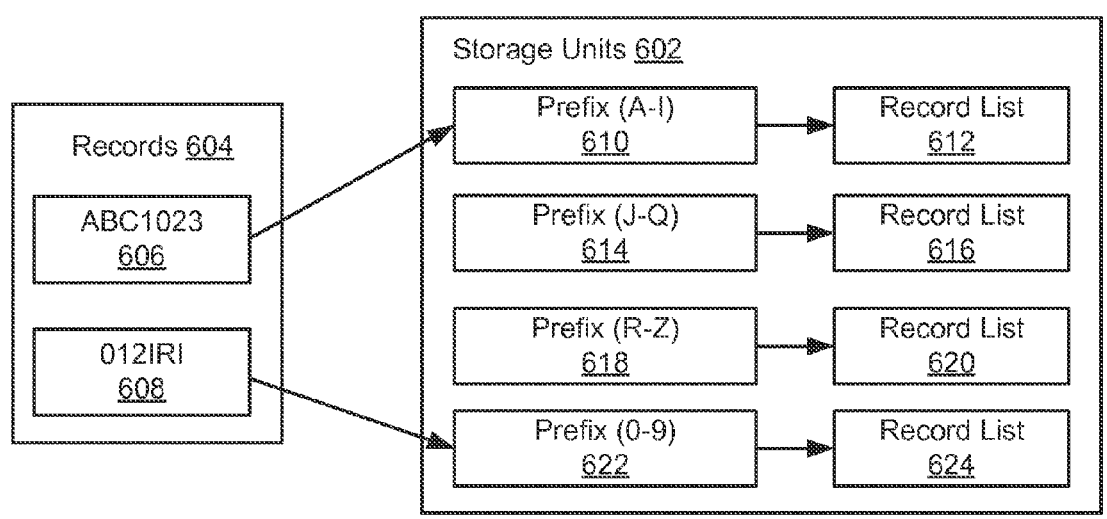
FIG. 6 is a block diagram illustrating an example implementation of storage and querying techniques used in the systems of FIGS. 1 and 2.

FIGS. 4-6 illustrate more detailed example implementations, in which these and other features and functions of the systems of FIGS. 1 and 2 are described in more detail. Specifically, FIG. 4 is a flowchart 400 illustrating example operations of the systems of FIGS. 1 and 2 in the context of the types of image-based surveillance systems already referenced. Meanwhile, FIGS. 5 and 6 provide further detailed examples in the more specific context of image-based surveillance systems used for vehicle tracking.

In the example of FIG. 4, images are received from cameras (402). For example, in addition to the vehicle tracking surveillance systems described herein, it will be appreciated that, of course, cameras may be used to track virtually any item. For example, cameras may be used to track individuals, e.g., within public places such as airports, shopping malls, or on city streets. In further examples, cameras may be utilized to track movements of items, e.g., within manufacturing or warehouse facilities.

All such received images may initially be stored within a priority queue, using a default queue scheme (404). For example, as described above with respect to the priority queue 210, a default queue scheme may include simple, time ordered storage of received images, in the absence of any priority label having been received.

Then, when a priority request is received (406), the corresponding priority label may be stored in conjunction with designated images (408). For example, as described, priority labels may be received by way of the priority request handler 154, and stored within the priority label repository 156.

After receipt of the priority label, images may be continued to be received and stored using the default queue scheme (410), as long as a prioritized image is not detected (412). Upon detection of a prioritized image (412), the prioritized image may be stored within a corresponding priority level of the priority queue, and ahead of previously-stored images inserted within the priority queue using the default queue scheme (414).

In this way, the prioritized image may be processed essentially immediately (416). If a real-time alert is required with respect to the prioritized, processed image (418), then the corresponding real-time alert may be issued (420). For example, if the captured images are of individual persons, and a high priority individual is identified for processing from the priority queue, and if a real-time alert related to detection of presence of the individual in question is required, then the surveillance manager 102, e.g., using the alert generator 138 of the server 128, may issue, using an appropriate GUI, an alert notifying the user of the system 100 of the detection of the prioritized individual and associated captured image.

Otherwise, if a real-time alert is not required (418), then the processed, prioritized image may be stored as a data record within the load balanced key value data storage (420). Of course, such a data record may also be stored within the load balanced key value data storage following an issuance of any required real-time alert (420).

Subsequently, a query may be received for processing against the key-value data storage (420). For example, the query handler 160 may be configured to receive queries from the user of the system 100, for application by the query processor 152 at the storage units 108. Then, the distributed and load balanced nature of the storage units 108, and the use of the key-value data storage to quickly and reliably execute queries against data records within the various storage units 108 including the prioritized image data records and included image metadata) enable fast and reliable return of query results (426).

As referenced above with respect to FIG. 4, image based surveillance systems, including video based surveillance systems, may be deployed in a variety of settings and for a variety of purposes. In many such settings, as also described, a number of items being tracked may be very large, and, moreover, may vary significantly over different periods of time.

Examples related to vehicle surveillance have been referenced herein as being particularly representative of the types of difficulties encountered in the context of such high volume image tracking surveillance systems. For example, in large cities, large numbers of cameras have been positioned and configured for tracking vehicles within traffic flows. Such surveillance systems are used for public security, pursuing criminal vehicles, recovering stolen vehicles, anti-terrorism measures, and various computer-aided patrolling applications.

Over any appreciable period of time, traffic in a given location may vary widely between traffic volumes observed at peak travel times, as compared to traffic volumes experienced, e.g., late at night, or at other off-peak times. In peak hours, when traffic volume is high, a single camera may capture, for example, 20-30 vehicles within a single minute (e.g., supposing for the sake of example that vehicles are passing the camera at an average speed of 60 km per hour). Further, in the context of large cities, a number of cameras being used may be well into the thousands. Consequently, a number of images captured for processing within a single minute, within the city as a whole, may be in the hundreds of thousands of images.

During peak times, generally speaking, the priority queue 126 will be relatively long, and all the available servers will be relatively busy with processing. On the other hand, during idle or non-peak times, the priority queue will become shorter or empty, depending on a length of the idle time and a computing ability of available servers within the server farm 124.

In the context of vehicle tracking, for each image, information may be extracted, including a vehicle plate number, vehicle color, or vehicle make and model. Further, as referenced above, one or more such images of a particular vehicle may be analyzed or otherwise processed to determine whether the vehicle in question has violated a traffic rule, such as exceeding a maximum allowable speed limit. Of course, a need for processing multiple images in conjunction with one another to derive such information will generally only increase processing and storage requirements of a surveillance system being used.

In the example of FIG. 5, it is assumed that vehicle images have been received from deployed cameras in a time ordered stream, as described above. Also, the received vehicle images are assumed, as just described with respect to FIG. 4, to be initially inserted in a default, e.g., time ordered, queue scheme. That is, initially, all the received images have the same default priority level, and are processed in order, accordingly.

Upon receipt of a priority label from a user, designating high priority vehicle(s), the priority request handler 154 may, in example implementation, first locate a most recent location at which the specified, critical vehicle appeared. Then, the queue manager 158 may proceed to increase a priority label associated with cameras that are geographically proximate to the most recent location of the critical vehicle. Accordingly, priorities of the priority queue being used may be automatically adjusted to reflect such changes, so that, afterwards, the priority queue will first return images being received from the cameras having relatively higher priority levels.

Thus, in the example of FIG. 5, a high priority vehicle image may be received from the priority queue (502). As part of the processing thereof, a vehicle color may be recognized for the vehicle (504), and the vehicle plate number for the vehicle may also be recognized (506).

If a traffic rule has been broken (508), then a real-time alert may correspondingly be issued (510). For example, the vehicle may be determined to be parked in a no parking zone, or to be in the process of running a stop sign or a red light. Then, the issued real-time alert may include both the vehicle color and the vehicle plate number, so that, for example, law enforcement officials may take appropriate corrective action.

Once the real-time alert has been issued, or if no immediate traffic rule has been determined to have been broken (508), the high priority vehicle image and associated metadata (e.g., the vehicle color) may be written to the associated key-value storage, using the vehicle plate number as the unique key (512). More detailed example implementations in which the license plate number is used as a unique key within the key value data storage are provided below, with respect to FIG. 6.

Once storage has occurred, one or more queries may be received and processed against the key value data storage, to thereby provide corresponding query results in a fast, accurate, and reliable manner (514). For example, a user such as a law enforcement official may query the key value data storage to attempt to identify a stolen vehicle. For example, such a user might initially query the data storage for all cars having a certain color, matching a color of the stolen car, and may thereafter refine the query by further specifying a make/model or other characteristic of the vehicle being sought. As may be appreciated, due to the use of the priority queue and related techniques described herein, such query results may be available very quickly within the data units 108, and, due to the distributed and load balanced nature of the storage units 108, desired query results may be obtained in a fast and efficient manner.

More specifically, as described with respect to FIG. 6, storage units 602, representing an example instance of the storage units 108 of FIG. 1, may be configured in a manner that achieves features and advantages associated with the use of the type of distributed, load balanced storage techniques just referenced. Specifically, in the example of FIG. 6, it may occur that each image data record received from the tracking records stream service 140 of the processing units 106 of FIG. 1 may be stored using the unique license plate number of the vehicle in question as a key within the key value data storage scheme. For example, where the key is the license plate number, the value may include a list of one or more tracking records of the related vehicle. In more specific example implementations, where allowed, a plate number exchange may be utilized to implement a key that includes a combination of the license plate number and an owner name or identifier.

As referenced above, the unique key, e.g., the license plate number, may be organized in the context of one or more hash tables to enable high speed access thereto, where, as already described, the resulting hash table may be stored in a distributed fashion. Specifically, for example, it may be assumed for the sake of example that all plate numbers within a given jurisdiction include only numerical digits or capitalized English letters.

In such examples, a total number of characters and available plate numbers will range from A-Z and from 0-9, resulting in a total of 36 possible characters. For the sake of the example, it may occur that the storage units 602 include four illustrated storage units 610, 614, 618, and 622. Then, as also illustrated, each storage unit may include, or be associated with, a corresponding list of data records. As shown, the storage unit 610 includes a records list 612, the storage unit 614 includes a records list 616, the storage unit 618 includes a records list 620, and the storage unit 622 includes a records list 624.

In the example, and assuming an equally distributed data store, storage locations for records to be included within the various records list 612, 616, 620, and 624 may be assigned by separating a storage location of image data records based on a prefix of corresponding license plate numbers. Consequently, as shown, the storage unit 610 may be associated with license plate numbers having a prefix ranging from the letter A to the letter I, while the storage unit 614 may be utilized for license plate numbers having a prefix ranging from J-Q. Similarly, the storage unit 618 may be utilized to store license plate numbers having a prefix from R-Z, and the storage unit 622 may be utilized to store image data records for vehicles having a license plate prefix between 0 and 9.

Thus, as shown, received image data records 604 may include a first image data record 606 and a second image data record 608, corresponding to respective vehicles having the mentioned license plate numbers. Then, as may be appreciated from the above description, and as illustrated in the example of FIG. 6, the image data record 606 includes a key "ABC1023." Therefore, the associated image data record has a prefix "A" and belongs within the records list 612 of the storage unit 610. Similarly, a second license plate number "012IRI" for the image data record 608 begins with a prefix "0." As a result, the image data record 608 is assigned to the records list 624 of the storage unit 622.

An example of pseudocode for implementing the above-described data storage techniques for hash table based insertion is provided below:

```
Hash-Table Based Insertion
Input: Tracking Record (TR)
1 INSERTION(TrackingRecord TR)
2
3 While(TRUE)
4      plateNumber <- GetPlateNumber( )
5      prefix <- GetPrefix(plateNumber)
6      switch(prefix)
7          Case: A-I
8             InsertIntoServer(1, TR); Break ## 1 is the id of the first
              server
9          Case: J-Q
10            InsertIntoServer(2, TR); Break
11         Case: R-Z
12            InsertIntoServer(3, TR); Break
13         Case: 0-9
14            InsertIntoServer(4, TR); Break
15
16 ## execute insertion step
```

Thus, both processing loads and storage loads may be balanced within the distributed system of FIG. 1. In the example design of the system 100 of FIG. 1, the priority queue 126 is deployed separately from the various servers 128-134 of the server farm 124, so that the priority queue 126 may be leveraged to provide centralized control for distribution of processing tasks among the servers 128-134.

For example, the various servers 128-134 may be configured to request, in a proactive manner, new processing tasks, upon completion or near completion of an existing processing task. Consequently, it becomes straightforward for the priority queue 126 to distribute the various required processing task among the available servers 128-134.

Also advantageously, the centralized nature of the priority queue 126 helps ensure straightforward optimization of a number of available servers within the processing units 106. For example, if a total processing load (e.g., total number of images) is defined as "N," and there are "n" servers, then a computing load in each server is "N/n" (assuming for the sake of the example that all the available servers are functionally similar or identical). If one server is removed, the processing load for each remaining computer would thus be "N/(n−1)."

Thus, it may be appreciated that servers may be easily added or removed from the server farm 124, depending upon an availability thereof. As a result, virtually any desired trade-off between costs associated with obtaining and deploying additional servers, compared with increases/decreases in available processing power, may be selected. As a result, a desired, customized optimization of a desired balance of costs and computing abilities may be chosen and implemented by the user of the system 100.

With respect to the storage units 108, represented in FIG. 6 as the storage unit 602, storage burdens may be shared as evenly as reasonably possible. For example, in the example of FIG. 6, in which records are stored based on detected prefix information for observed license plate numbers, it may occur by chance that a disproportionate number of the vehicles have a license plate with a prefix associated with a particular storage unit in the scheme of FIG. 6.

Consequently, it may occur that usage of the storage units may not be balanced, such as when a particular storage unit happens to store a larger quantity of data records. In such cases, for example, statistics on relative frequencies of each prefix may be calculated. Then, if a disproportionate number of license plate numbers begins with the letter "A," then, data records having a prefix starting with A may be stored in another storage unit, which is then determined to be associated with a particular prefix range for which detected frequency is low.

In other example implementations, if a size of data records having a prefix "A" becomes large, e.g., larger than the storage typically available on a user workstation computer, additional measures may be taken. For example, two digit prefix values may be utilized, based on combinations of the available letter and numerical prefix values. For example, A[A-Z] and A[0-9] may leverage the fact that both of two groups start with the prefix "A" but have different second characters. For example, the second character of the first group ranges from A-Z (e.g., AN, AA, or AX), while the second character of the second group ranges from 0-9 (e.g., A0, A7, or A2).

Thus, the various features and functions described above with respect to FIGS. 1-6 may be understood to provide example systems that enable large scale surveillance data processing. The illustrated and described systems may process image data in a load balanced fashion, while also storing them in balanced storage units, as described. The system 100 of FIG. 1 thus provides a fundamental architecture, so that many other applications may be built using the included features.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
   at least one processor; and
   instructions recorded on a non-transitory computer-readable medium, and executable by the at least one processor, the system including
   a surveillance management system configured to receive surveillance tracking data tracking movements of a plurality of sensed items moving individually past at least a subset of a network of a plurality of geographically-spaced motion sensors, to thereby provide a plurality of sensed data files in which each sensed data file corresponds to a motion capture of a sensed item of the sensed items, as captured by a corresponding motion sensor of the plurality of geographically-spaced motion sensors;
   a priority request handler configured to receive a priority request from a user to associate a priority label with a sensed data file of the plurality of sensed data files, the sensed data file being included within a time series of sensed data files received from a the plurality of geographically-spaced motion sensors; and
   a queue manager configured to store the sensed data file within a priority queue in association with the priority label, and independently of a temporal order of a the time series of sensed data files, and further configured to retrieve the sensed data file from the priority queue, based on the priority label, for processing thereof to thereby provide the user with a sensed data record in which metadata characterizing the motion capture of the sensed item is included.

2. The system of claim 1, wherein the priority request handler is configured to associate the priority label with the sensed data file, based on identification of a the sensed item represented within the sensed data file.

3. The system of claim 1, wherein the priority request handler is configured to associate the priority label with the sensed data file, based on historical sensed data records related to sensed items represented within corresponding sensed data files of the sensed data files.

4. The system of claim 1, wherein the priority request handler is configured to associate the priority label with the sensed data file including associating at least one of the plurality of geographically-spaced motion sensors with the priority label, based on a prediction of a sensing of the sensed item represented within the sensed data file by the at least one sensor.

5. The system of claim 1, wherein the priority queue includes a plurality of priority levels, and the priority label corresponds to one of the priority levels.

6. The system of claim 5, wherein a lowest-priority level of the plurality of priority levels is a default level for sensed data files not associated with any priority level, and wherein sensed data files at the default level are processed after higher-priority levels and in a time-ordered fashion.

7. The system of claim 1, wherein the sensed data file associated with the priority label is later-received than a lower priority sensed data file, but is processed to obtain the sensed data record prior to processing of the lower priority sensed data file.

8. The system of claim 1, wherein the queue manager is configured to distribute the sensed data file, along with a plurality of sensed data files obtained by the plurality of geographically-spaced motion sensors, among a plurality of load-balanced servers for processing thereof.

9. The system of claim 1, wherein the processing of the sensed data file to obtain the sensed data record includes analyzing the sensed data file to determine whether a real-time or near real-time alert is required, based on processing criteria.

10. The system of claim 1, wherein the queue manager is configured to store the sensed data record, along with a plurality of sensed data records, among a plurality of load-balanced storage units.

11. The system of claim 10, wherein the storage units are configured to store sensed data records using a key-value and hash based storage scheme, and wherein a key of the storage scheme is derived from a unique physical characteristic of the sensed item as included within sensed data of the sensed data record.

12. The system of claim 10, further comprising a query handler configured to receive a query and apply the query against sensed data records within the load-balanced storage units, to thereby obtain query results including the sensed data record.

13. A computer-implemented method for executing instructions stored on a non-transitory computer readable storage medium, the method comprising:
    receiving surveillance tracking data tracking movements of a plurality of sensed items moving individually past at least a subset of a network of a plurality of geographically-spaced motion sensors, to thereby provide a plurality of sensed data files in which each sensed data file corresponds to a motion capture of a sensed item of the sensed items, as captured by a corresponding motion sensor of the plurality of geographically-spaced motion sensors;
    storing the sensed data files in a time-ordered fashion within a priority queue;
    receiving a priority request from a user to associate a priority label with a designated sensed data file of the plurality of sensed data files, for a designated item of the sensed items that is expected to be sensed by at least one of the plurality of geographically-spaced motion sensors;
    receiving the designated sensed data file and relating the designated sensed data file with the priority label;
    storing the designated sensed data file in the priority queue, ahead of the earlier-received, time-ordered sensed data files; and
    retrieving the designated sensed data file for processing to thereby provide the user with a designated sensed data record in which metadata characterizing the motion capture of the sensed item is included, before retrieving the earlier-received, time-ordered sensed data files.

14. The method of claim 13, wherein the priority label is associated with the designated sensed data file including associating at least one of the plurality of sensors with the priority label, based on a prediction of a sensing of the designated item by the at least one sensor.

15. The method of claim 13, wherein the priority queue includes a plurality of priority levels, and the priority label corresponds to one of the priority levels.

16. A computer program product, the computer program product being tangibly embodied on a non-transitory computer-readable storage medium and comprising instructions that, when executed, are configured to cause at least one processor to:
    receive surveillance tracking data tracking movements of a plurality of sensed items moving individually past at least a subset of a network of a plurality of geographically-spaced motion sensors, to thereby provide a plurality of sensed data files in which each sensed data file corresponds to a motion capture of a sensed item of the sensed items, as captured by a corresponding motion sensor of the plurality of geographically-spaced motion sensors;
    receive a priority request from a user to associate a priority label with a sensed data file of the plurality of sensed data files, the sensed data file being included within a time series of sensed data files received from a the plurality of geographically-spaced motion sensors;
    store the sensed data file within a priority queue in association with the priority label, and independently of a temporal order of a the time series of sensed data files;
    retrieve the sensed data file from the priority queue, based on the priority label; and
    process the sensed data file to thereby provide the user with a sensed data record in which metadata characterizing the motion capture of the sensed item is included.

17. The computer program product of claim 16, wherein the instructions, when executed, are configured to cause the at least one processor to:
    process of the sensed data file to obtain the sensed data record including analyzing the sensed data file to determine whether a real-time or near real-time alert is required, based on processing criteria.

18. The computer program product of claim 16, wherein the sensed data files correspond to sensed items represented therein, and wherein the priority label is associated with the sensed data file based on expected inclusion of a designated item that is expected to be sensed by at least one of the plurality of sensors.

19. The computer program product of claim 16, wherein the instructions, when executed, are configured to cause the at least one processor to:
    distribute the sensed data file, along with a plurality of sensed data files obtained by the plurality of sensors, among a plurality of load-balanced servers for processing thereof; and
    store the sensed data record, along with a plurality of sensed data records corresponding to the plurality of sensed data files, among a plurality of load-balanced storage units.

20. The computer program product of claim 16, wherein the plurality of geographically-spaced motion sensors include a plurality of cameras and the sensed data files include image files, and further wherein the priority label is associated with the sensed image file based on inclusion of a designated sensed item therein.

* * * * *